United States Patent
Ho

(10) Patent No.: US 8,644,515 B2
(45) Date of Patent: Feb. 4, 2014

(54) DISPLAY AUTHENTICATED SECURITY ASSOCIATION

(75) Inventor: Jin-Meng Ho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 217 days.

(21) Appl. No.: 13/208,224

(22) Filed: Aug. 11, 2011

(65) Prior Publication Data
US 2012/0039474 A1 Feb. 16, 2012

Related U.S. Application Data

(60) Provisional application No. 61/372,523, filed on Aug. 11, 2010.

(51) Int. Cl.
*H04L 29/06* (2006.01)

(52) U.S. Cl.
USPC .......... 380/278; 370/328; 455/411; 455/41.2; 705/71

(58) Field of Classification Search
USPC ........................................................ 380/278
See application file for complete search history.

(56) References Cited

U.S. PATENT DOCUMENTS

| | | |
|---|---|---|
| 7,263,345 B2 | 8/2007 | Kotola et al. |
| 7,409,552 B2 * | 8/2008 | Buttyan et al. ................. 713/172 |
| 7,831,207 B2 | 11/2010 | Mercurio et al. |
| 2004/0083368 A1 * | 4/2004 | Gehrmann ..................... 713/171 |
| 2009/0227282 A1 * | 9/2009 | Miyabayashi et al. ...... 455/552.1 |

OTHER PUBLICATIONS

Badra, Mohamad, Guillet, Thomas, and Ahmed Serhrouchni. "Random Values, Nonce and Challenges: Semantic Meaning versus Opaque and Strings of Data." IEEE 70th Vehicular Technology Conference Fall (VTC 2009-Fall), 2009, pp. 1-5.*

* cited by examiner

*Primary Examiner* — Taghi Arani
*Assistant Examiner* — Narciso Victoria
(74) *Attorney, Agent, or Firm* — Steven A. Shaw; Wade James Brady, III; Frederick J. Telecky, Jr.

(57) ABSTRACT

A system and method for establishing a mutual entity authentication and a shared secret between two devices using displayed values on each device. Unique first private keys and first public keys are assigned to both devices. The public keys are exchanged between the two devices. Both devices compute a shared secret from their own private keys and the received public keys. Both devices compute, exchange, and verify their key authentication codes of the shared secret. If verification is successful, both devices use the shared secret to generate a displayed value. One or more users compare the displayed values and provide an indication to the devices verifying whether the displays match. If the displays match, then the devices compute a shared master key, which is used either directly or via a later-generated session key for securing message communications between the two devices.

22 Claims, 4 Drawing Sheets

DISPLAY AUTHENTICATED SECURITY ASSOCIATION

CROSS-REFERENCE TO RELATED APPLICATIONS

This application claims the benefit of the filing date of U.S. Provisional Patent Application No. 61/372,523 which is titled "Method for Display Authenticated Security Association" and was filed Aug. 11, 2010, the disclosure of which is hereby incorporated by reference herein in its entirety.

TECHNICAL FIELD

Embodiments of the invention are directed, in general, to network security and, more specifically, to using a display for authenticated key exchange, key establishment, or security association.

BACKGROUND

Message exchanges between two or more parties in a wireless network or over the Internet are vulnerable to eavesdropping and manipulation by other parties. Security is required to protect the confidentiality and integrity of the message exchanges. Typically, messages are protected through encrypting and authenticating the messages with a shared session key between the intended parties. A shared session key is often derived from a shared master key (MK) that is rarely used and, therefore, the shared master key is more tightly guarded against potential compromise.

In low-power wireless networks, such as a body area network, a plurality of nodes form a network with a hub, which may also be referred to as a network controller or coordinator. The nodes may establish secured or unsecured connections with their desired hub. The amount and frequency of information exchanged between each node and the hub varies by time and by node. The nodes and hub designate allocation intervals in which they can communicate over a shared channel.

Communication between two parties over an open channel poses several security problems for the communicating parties. Their communications can be overheard or forged by a third party, which poses a problem for them if they wished their exchanges to be confidential and authentic.

The risk of a third party intercepting, interpreting, and interjecting messages over an open channel is typically addressed by encryption and authentication performed with a secret key shared only between the two legitimate parties. Such a secret key in turn is often established based on public key cryptography methods. These methods allow two parties to exchange a public piece of information and use their counterparty's public information, along with a piece of their own private information, to derive the shared secret key that no one with knowledge only of the parties' public keys could trivially determine.

These exchanges of public information to generate secrets shared only between the two communicating parties, called Diffie-Hellman key exchanges, are now used widely for pairing or associating two communicating parties with each other over an open channel. Two popular algorithms to use to this end are exponential discrete logarithm cryptography and elliptic curve cryptography.

Diffie-Hellman key exchanges, however, do not solve the problem of impersonation, where a third party is pretending to be one of the two legitimate parties in order to obtain, modify, or/and inject information. This sort of attack is particularly effective when the same party impersonates each of the two parties to a communication to the other party, gaining access to the information exchanged between them. These so-called "man in the middle" (MITM) attacks present an ongoing problem of authentication in which a party communicating over an open channel must authenticate the identity of the counterparty.

One popular solution to this problem uses a password or other predetermined shibboleth. The two parties authenticate each other by each confirming that the other party has knowledge of the same password. This poses its own issues because each party risks exposing the password to a third party, often due to intended or unintended human behavior. In particular, the central controller of a network could be compromised, exposing its list file containing the passwords for the nodes it controls to wrong hands. Once an adversary obtains a password intended to be shared only between two legitimate parties, the adversary can impersonate one of these parties to communicate with the other party breaking the security check.

Two parties that have never known each other before may use the Diffie-Hellman key exchange protocol to establish a secret (a master key) shared only between them in the presence of eavesdroppers. However, they are vulnerable to the man-in-the-middle attack by which a third party (an adversary) intercepts the messages exchanged between the two legitimate parties and injects its own by impersonating each of the two parties while exchanging with the other, respectively. As a result, the two parties end up with communicating through the third party while believing they are talking to each other directly.

It is often inconvenient or impossible to manually install or reinstall a pre-shared password, a shared session key or master key of sufficient length into the parties' desired communication. The Diffie-Hellman key exchange protocol, which is based on public key cryptography, allows two parties not previously known to each other to establish a shared secret by openly exchanging their public keys. The shared secret can be used to derive a shared master key and/or session key. The shared secret remains a secret between the two communication parties even in presence of third-party eavesdroppers, provided the protocol parameters are chosen appropriately.

In particular, after the exchange of their public keys but not private keys, both parties create a shared secret (SS) based on their respective private keys (a, b) and received public keys (B, A). The shared secret can then be used to create a master key and/or session key for securing future communications between the two parties. A third party, such as an eavesdropper, with access to the public keys of the two parties cannot recreate the shared secret (SS) because the third party does not have the other parties' private keys (a, b). The private and public keys may be pre-installed into the device or they may be selected by the device.

The Diffie-Hellman key exchange, nevertheless, is susceptible to impersonation and man-in-the middle attacks. A third-party imposter can impersonate one of the two legitimate parties, exchanging public keys and hence establishing a shared secret with the other, without the latter knowing the truth. While the two legitimate parties start exchanging their public keys, a third party can also intercept their messages and inject its own messages to impersonate both of the sending parties separately. Thus, the two legitimate parties unknowingly communicate with the malicious third party instead of each other as they believe.

To thwart such attacks, entity authentication is introduced into the key exchange between two communicating parties, to ensure that each is communicating with the expected or claimed other party but not an imposter. Using a shared password for entity authentication has been widely used. It is much more convenient to share a relatively short password than a long secret key between two parties. However, many password-based authentication protocols are vulnerable to offline dictionary attacks. For example, when a claimant attempts to corroborate its identity to a verifier by sending a message showing knowledge of the password, a third party impersonating the verifier can record the message and thereafter do a password search in the short password space against that message.

The term "party" as used herein will be understood to include devices, such as nodes and hubs communicating in a network, as well as individual users. The following terms are also meant to be synonymous: key exchange, key agreement, key establishment, and security association. Also interchangeable are method, protocol, procedure, and process.

SUMMARY

Embodiments of the invention compare displays at both parties to communication as part of an authentication association procedure. The displays are generated based upon public keys exchanged between two parties. Each party selects a nonce to be exchanged with the other party. A first party modifies its selected nonce using its public key, and sends the modified nonce to a second party. Each party uses its own private key and the other party's public key to compute a shared secret. Both parties then compute a first and second hash of their computed shared secret. The hashes are a function of shared secret and the modified nonce.

The second device sends its first key message authentication code (KMAC) to the first device, which compares the first KMAC received from the second device to the first KMAC computed by the first device itself. If the comparison matches, then the first device sends the second KMAC to the second device, which then compares the second KMAC received from the first device to the second KMAC computed by the second device itself. After verifying by both devices that the KMAC comparisons match, the devices each compute a display value to be displayed to a user. If the user confirms that the display values match, then the devices compute a shared master key from the shared secret.

This process allows two legitimate parties to generate and display the same number, which a third party attacker or imposter, as mentioned earlier, cannot computationally forge.

The devices may use a discrete logarithm or an elliptic curve discrete logarithm for the public key computation and exchange. The devices may use cipher-based message authentication code (CMAC) or hash-based message authentication code (HMAC) algorithms to compute the key message authentication code (KMAC) and other appropriate authentication code parameters for key derivation.

BRIEF DESCRIPTION OF THE DRAWINGS

Figure 1A:
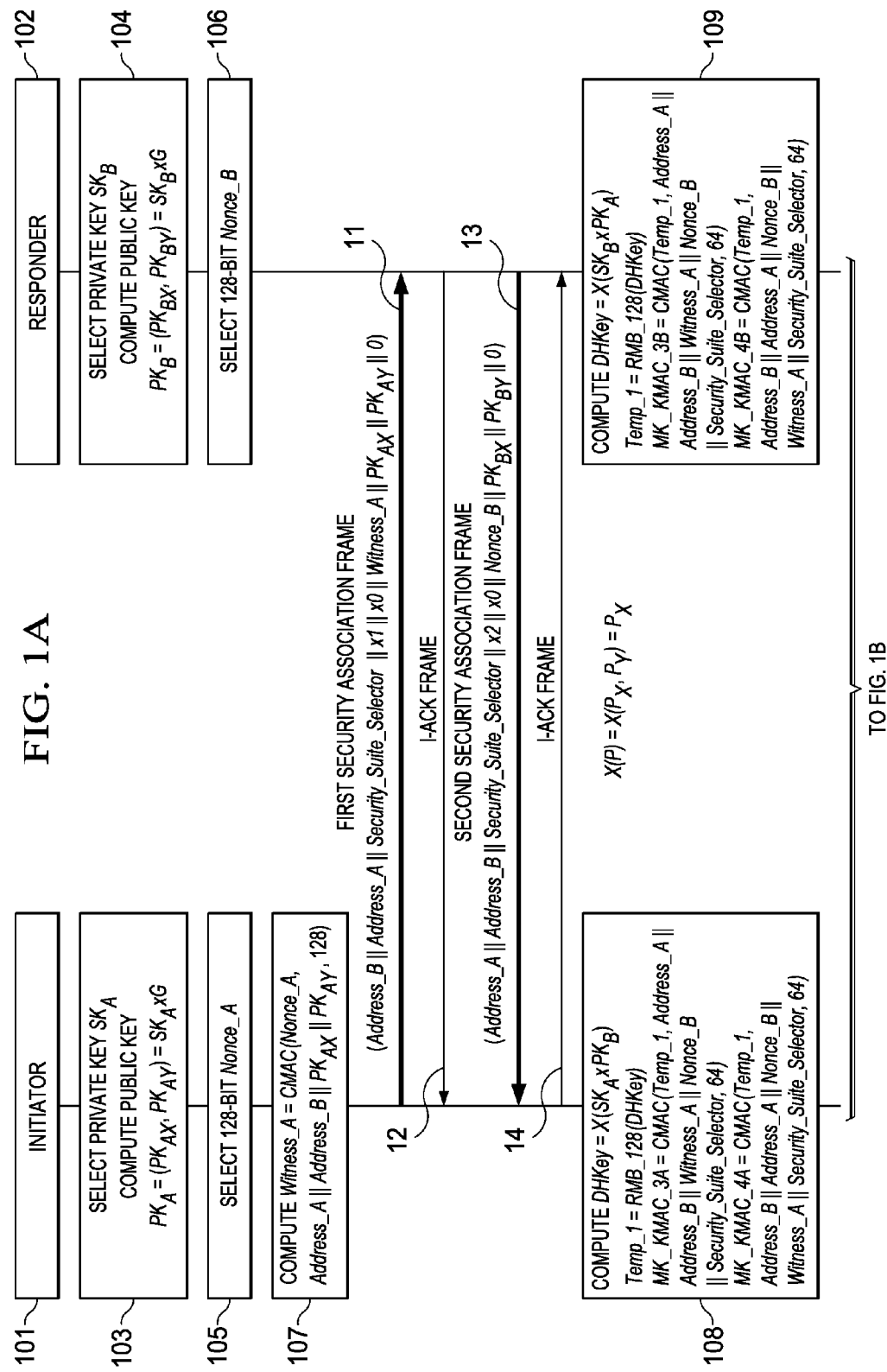
Figure 1B:
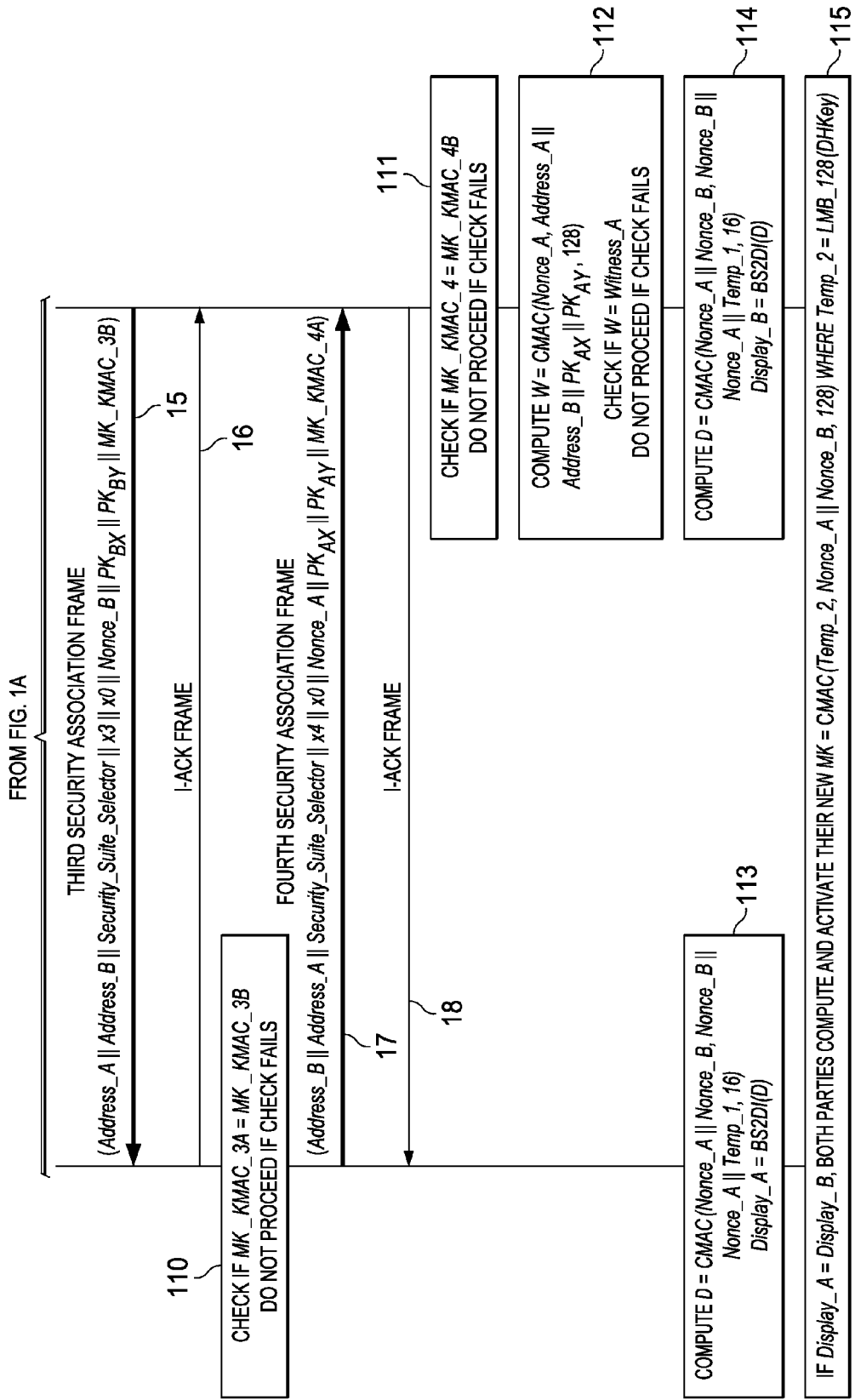
Figure 2:
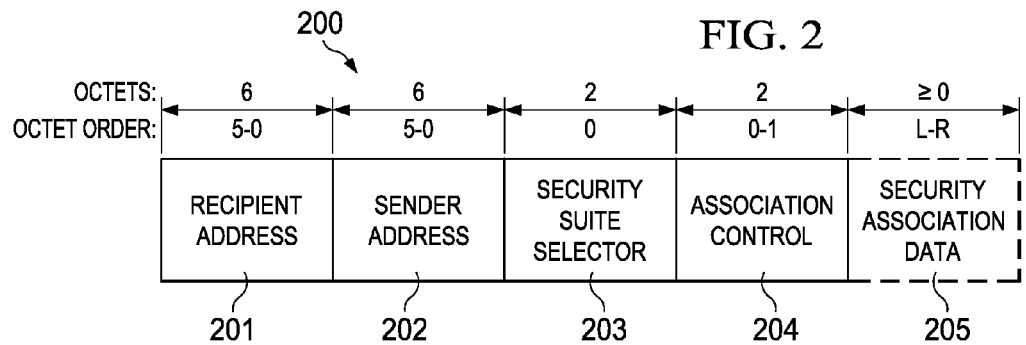
Figure 3:
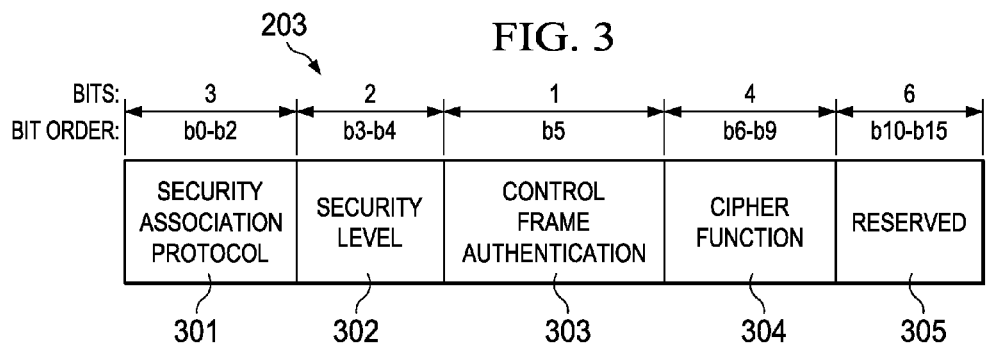
Figure 4:
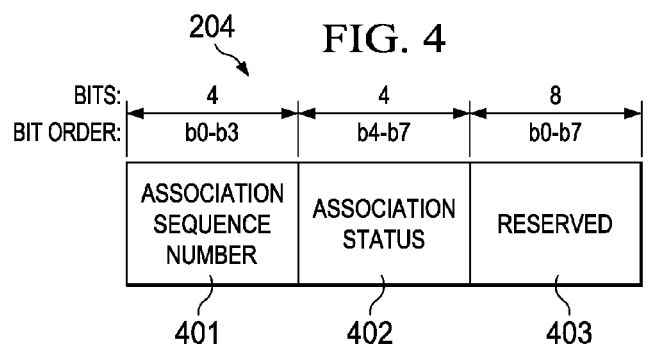
Figure 5:
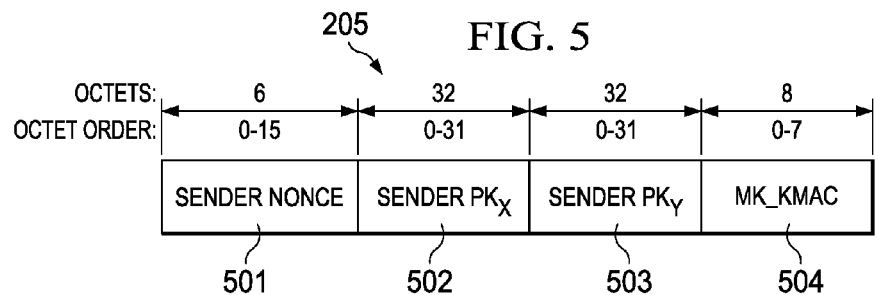
Figure 6:
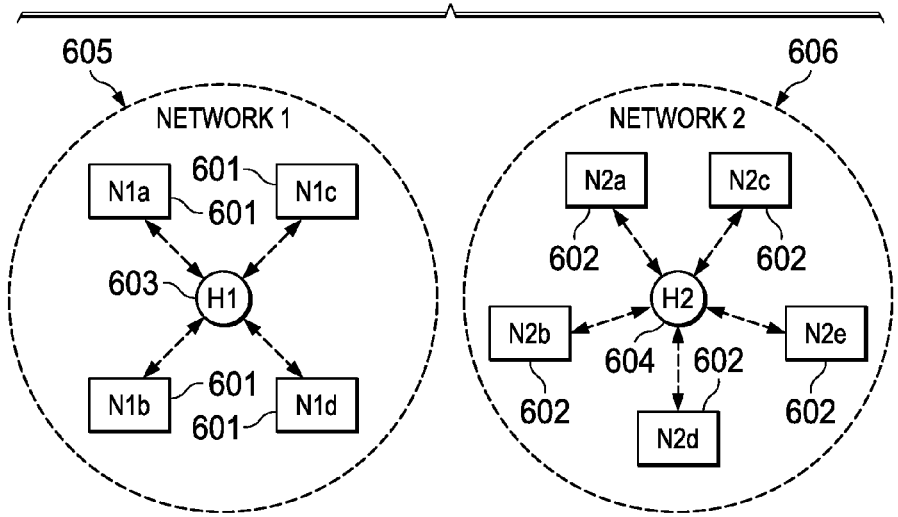
Figure 7:
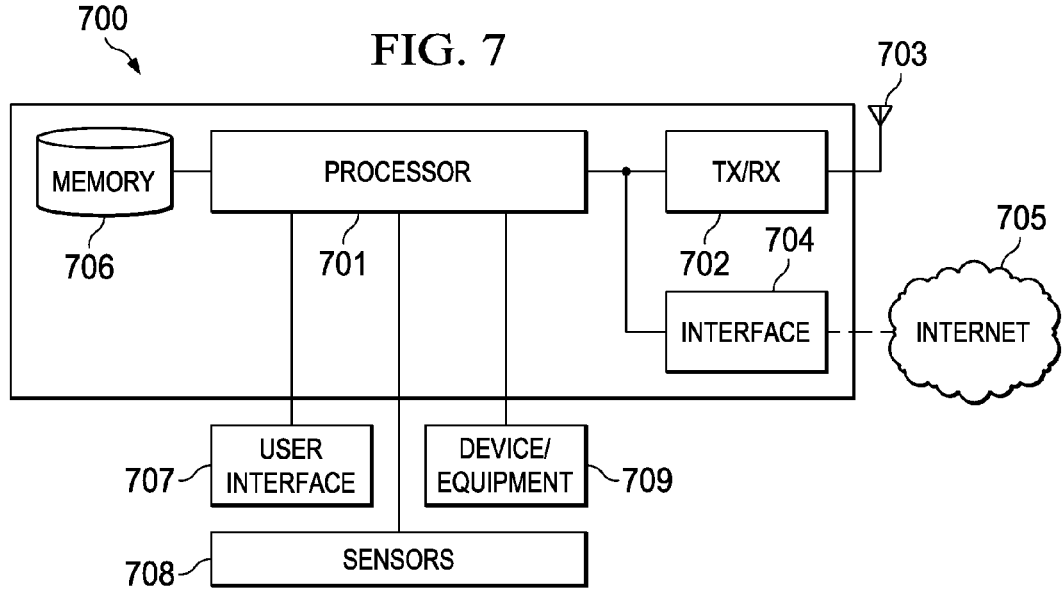

Having thus described the invention in general terms, reference will now be made to the accompanying drawings, wherein:

FIG. 1 illustrates a detailed display authenticated association procedure according to an exemplary embodiment;

FIG. 2 illustrates data in an example of a security association frame that can be exchanged between an Initiator and a Responder (such as a node and a hub) to execute the display authenticated security association procedure;

FIG. 3 illustrates the parameters of a security suite selector field according one embodiment;

FIG. 4 illustrates the format of an association control field in one embodiment;

FIG. 5 illustrates the format of a security association data field in one embodiment;

FIG. 6 is a block diagram illustrating a network topology employing embodiments of the invention; and FIG. 7 is a block diagram of an exemplary embodiment of a device for providing communications using display authenticated security association.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Embodiments allow for the reuse of the unauthenticated Diffie-Hellman key exchange messages that are the building blocks of other authenticated security association protocols such as those described in pending U.S. patent application Ser. Nos. 12/539,733, filed Aug. 12, 2009; 12/697,110, filed Jan. 30, 2010; and 12/697,113, filed Jan. 29, 2010, the disclosures of which are hereby incorporated herein in their entirety. The legitimate parties to a communication generate and display the same number, which third parties cannot forge. If a third party is mounting a man-in-the-middle attack, the two legitimate parties will not display the same number, thereby thwarting that attack.

The embodiments disclosed herein may be used with unauthenticated association protocols that are the basis of other authenticated association protocols. Unlike existing solutions to the authentication problem, the use of the display-authentication techniques disclosed herein does not alter these building-block association protocols, thereby allowing the full reuse of those other protocols and, hence, reducing the implementation complexity and increasing interoperability.

In one embodiment, a node, but not a hub, may initiate a security association procedure to run the display authenticated association protocol by sending a first Security Association frame of the procedure to the hub. The node and the hub each have a display that is used with the display authenticated association protocol. The display may be, for example, a five-digit decimal number or any other number of ASCII or other characters. The displays are used to confirm that the legitimate parties are communicating prior to generating their shared MK for the creation of their pairwise temporal key (i.e., session key), thereby preventing third parties from launching man-in-the-middle or other attacks.

Upon receiving the first Security Association frame, the hub sends the second Security Association frame to the node, which indicates that the hub has joined or aborted the security association procedure. If the node receives a second Security Association frame that indicates the hub is aborting the security association procedure, the node aborts the current security association procedure. The node may initiate a new security association procedure with a different security suite selector, as described below, if the hub aborted the procedure. The node may also initiate a new security association procedure at a later time if the hub aborted the security association procedure due to a temporary lack of resources.

The hub aborts the security association procedure if the node's public key ($PK_{AX}$, $PK_{AY}$), which is contained in the first Security Association frame, is not a valid public key. Otherwise, upon successfully sending a second Security Association frame indicating that it is joining the security association procedure, the hub sends a third Security Association frame to the node. The third Security Association frame sets a MK_KMAC (key message authentication code) field of the security association data to MK_KMAC_3 as calculated below.

The node will abort the security association procedure if the hub's public key ($PK_{BX}$, $PK_{BY}$), which is contained in the second Security Association frame, is not a valid public key. Otherwise, upon receiving the third Security Association frame with the MK_KMAC equal to MK_KMAC_3, the node shall send the fourth Security Association frame to the hub. The fourth Security Association frame sets the MK_KMAC field of the security association data to MK_KMAC_4 as also calculated below.

Upon successfully sending the fourth Security Association frame, the node displays a 5-digit decimal number (Display_A), for example, as derived below. Upon receiving the fourth Security Association frame with the MK_KMAC equal to MK_KMAC_4, the hub displays a 5-digit decimal number (Display_B), for example, as also derived below. It will be understood that the display value may be any number of alpha-numeric, ASCII, or other characters. After the displays on the node and hub have been verified to be the same, the devices are informed through respective user interfaces that their mutual authentication has succeeded. Otherwise, if the displays differ, the devices are each informed that their mutual authentication has failed.

Upon determining that their mutual authentication has succeeded, the node and the hub each compute the shared MK, as given below, treating their association procedure completed.

Although examples described herein refer to the comparison of characters displayed on different devices for authentication, it will be understood that in other embodiments the display may be a word, phrase, sentence, or other text. Alternatively, the display may be a code, color, icon, figure or other image. In other embodiments, instead of being visual, the display may be tactile, such as a vibration or other motion, or audible, such as a tone, ring, buzzer, horn, spoken word or other sound. For example, a device may have a library of text, images, motions, and/or sounds that may be correlated to the display value that is calculated from a shared secret.

FIG. 1 illustrates a detailed display authenticated association procedure according to an exemplary embodiment between two devices, such as a node and a hub. The procedure is started by Initiator 101 and joined or aborted by Responder 102. Initiator 101 and Responder 102 select a private key ($SK_A$, $SK_B$) and compute a public key ($PK_A$, $PK_B$) in steps 103, 104, respectively. In one embodiment, the private keys are a 256-bit integer, and the public keys are pair of 256-bit x and y coordinates of points on an elliptic curve over a finite field. In other embodiments, the private keys and public keys are 192-bit integers.

In the example of FIG. 1, Initiator 101 and Responder 102 use a key exchange based on an exponential discrete logarithm or an elliptic curve discrete logarithm to derive a shared master key. In one embodiment of the invention, an elliptic curve is characterized by the equation:

$$y^2 = x^3 + ax + b \bmod p, a, b \in GF(p), 4a^3 + 27b^2 \neq 0, \quad (1)$$

where GF(p) is a prime finite field. In an exemplary embodiment, the equation has the following values for its coefficients and domain parameters, as specified for Curve P-256 in Federal Information Processing Standard Publication (FIPS PUB) 186-3, with "p" (an odd prime), "r" (order of base point G), and "a" (a coefficient) given in decimal form, and coefficient "b" and base point "G"=(Gx, Gy) given in hex:

$p = 2^{256} - 2^{224} + 2^{192} + 2^{96} - 1 = 115792089210356248762697446949407573530086143415290314195536313308867097853951$ $r = 115792089210356248762697446949407573529996955224135760342422259061068512044369$ $a = p - 3$ $b = 5ac635d8aa3a93e7b3ebbd55769886bc651d06b0cc53b0f63bce3c3e27d2604b$ $G_x = 6b17d1f2e12c4247f8bce6e563a440f277037d812deb33a0f4a13945d898c296$ $G_y = 4fe342e2fe1a7f9b8ee7eb4a7c0f9e162bce33576b315ececbb6406837bf51f5$ The private keys $SK_A$ and $SK_B$ for Initiator 101 and Responder 102 are, in an exemplary embodiment, unique 256-bit integers in the range [1, r−1]. The corresponding 256-bit public keys $PK_A$ and $PK_B$ are computed as follows:

$$PK_A = SK_A \times G, PK_B = SK_B \times G, \quad (2)$$

where "×" denotes scalar multiplication of the base point $G = (G_x, G_y)$ by an integer (a private key) as described in A.9.2 of IEEE Std 1363-2000. A public key, denoted by a pair of x-coordinate and y-coordinate values, is treated as valid only if it is a non-infinity point on the elliptic curve defined above (i.e. its x and y coordinates satisfy the elliptic curve equation given above).

In steps 105, 106, Initiator 101 and Responder 102 independently generate a new 128-bit cryptographic random number or nonce (Nonce_A, Nonce_B) for use in the security association procedure.

In step 107, Initiator 101 computes a value Witness_A using a cipher-based message authentication code (CMAC) algorithm as follows:

$$\text{Witness\_}A = \text{CMAC}(\text{Nonce\_}A \| \text{Address\_}A \| \text{Address\_}B \| PK_{AX} \| PK_{AY}, 128), \quad (3)$$

where the functional notation CMAC(K, M, L) represents the L-bit output of the CMAC applied under key K to message M based on the AES forward cipher function, and the sign ∥ denotes concatenation of bit strings that are converted according to IEEE Std 1363-2000 from certain fields of the frames of concern.

Here, Address_A and Address_B are the addresses, such as a medium access control (MAC) sublayer address, for Initiator 101 and Responder 102, respectively. Nonce_A and Nonce_B are the nonces selected by Initiator 101 and Responder 102, respectively, in steps 105, 106.

To initiate a procedure for the display authenticated association protocol, Initiator 101 transmits a first Security Association frame 11 of the procedure to Responder 102. The first Security Association frame may have, for example, the format described in detail below and illustrated in FIGS. 2-5. In addition to address and administrative parameters, the first Security Association frame 11 includes a security suite selector parameter, the Witness_A parameter calculated in step 107, and the components of the Initiator's public key ($PK_{AX}$, $PK_{AY}$). Responder 102 may acknowledge receipt of the first Security Association frame 11 by sending Immediate Acknowledgement (I-Ack) frame 12.

Upon receiving the first Security Association frame 11, Responder 102 sends the second Security Association frame 13 to indicate that it is either joining or aborting the security association procedure. When joining the procedure, the second Security Association frame 13 has a similar format to the first Security Association frame 11, except that it contains the Responder's Nonce_B parameter and the components of the Responder's public key ($PK_{BX}$, $PK_{BY}$). Initiator 101 may acknowledge receipt of the second Security Association frame 13 by sending Immediate Acknowledgement (I-Ack) frame 14.

In step 108, Initiator 101 computes the shared secret "DHKey" using the following equation:

$$DHKey = X(SK_A \times PK_B) = X(SK_A \times SK_B \times G) \quad (4)$$

where $$X(P) = X(P_X, P_Y) = P_X \quad (5)$$

is the x-coordinate of P, which is computed from $SK_A \times PK_B$ at the Initiator and from $SK_B \times PK_A$ at the Responder.

Initiator 101 further derive the parameter Temp_1 as follows:

$$Temp\_1 = RMB\_128(DHKey) \quad (6)$$

which is a truncated version of the shared secret key (DHKey) using the right-most bits of the DHKey parameter, where RMB_n(S) is bit string truncation function that designates the n rightmost bits of the bit string S.

Initiator 101 also derives the parameters of a key message authentication code (MK_KMAC_3A, MK_KMAC_4A) using a cipher-based message authentication code (CMAC) algorithm as follows:

$$MK\_KMAC\_3A = CMAC(Temp\_1, Address\_A \| Address\_B \| Witness\_A \| Nonce\_B \| Security\_Suite\_Selector, 64) \quad (7)$$

$$MK\_KMAC\_4A = CMAC(Temp\_1, Address\_B \| Address\_A \| Nonce\_B \| Witness\_A \| Security\_Suite\_Selector, 64) \quad (8)$$

Similarly, in step 109, Responder 102 computes the shared secret "DHKey" using:

$$DHKey = X(SK_B \times PK_A) = X(SK_B \times SK_A \times G) \quad (9)$$

This value of DHKey should match the value calculated in step 108 and in equation (4) above. Responder 102 also computes Temp_1 using equation (6) above. Accordingly, the value of Temp_1 calculated by Responder 102 should also match the value calculated by Initiator 101 in step 108.

Responder 102 also derives the key message authentication code parameters (MK_KMAC_3B, MK_KMAC_4B) in step 109 using equations (7) and (8) above.

After calculating the parameters described above, Responder 102 transmits a third Security Association frame 15 of the procedure to Initiator 101. The third Security Association frame 15 includes address and administrative information along with Nonce_B, the components of the Responder's public key ($PK_{BX}$, $PK_{BY}$), and the value of MK_KMAC_3B as calculated by the Responder. In one embodiment of the invention, the third Security Association frame differs from the second Security Association frame only in the value of MK_KMAC_3B. Initiator 101 acknowledges receipt of the third Security Association frame 15 in Immediate Acknowledgement (I-Ack) frame 16.

In step 110, Initiator 101 compares MK_KMAC_3A (calculated by Initiator 101) to MK_KMAC_3B (sent by Responder 102) to verify that Responder 102 has calculated the same shared secret DHKey. If MK_KMAC_3A=MK_KMAC_3B in step 110, then the process continues.

If MK_KMAC_3A=MK_KMAC_3B, Initiator 101 sends a fourth Security Association frame 17 to Responder 102. The fourth Security Association frame 17 includes address and administrative information along with Nonce_A, the components of the Initiator's public key ($PK_{AX}$, $PK_{AY}$), and the value of MK_KMAC_4A as calculated by the Initiator 401. It is noted that the fourth Security Association frame 17 is the first time that Nonce_A is sent to Responder 102, which previously received the Witness_A parameter instead. It will be understood that in some embodiments, the value of Witness_A may be equal to Nonce_A, while in other embodiments, Witness_A is computed based upon Nonce_A, such as by using equation (3) above. Responder 102 acknowledges receipt of the fourth Security Association frame 17 with Immediate Acknowledgement (I-Ack) frame 18.

In step 111, Responder 102 compares MK_KMAC_4A (sent by Initiator 101) to MK_KMAC_4B (calculated by Responder 102) to verify that Initiator 101 has calculated the same shared secret DHKey. If MK_KMAC_4A=MK_KMAC_4B in step 111, then the process continues.

In step 112, Responder 102 computes the parameter W as follows:

$$W = CMAC(Nonce\_A, Address\_A \| Address\_B \| PK_{AX} \| PK_{AY}, 128) \quad (10)$$

Responder 102 then confirms that W=Witness_A received from Initiator 101 in step 11 to verify that the value of Nonce_A sent in the fourth Security Association frame 17 is not changed from the value of Nonce_A used in step 107 to compute the Witness_A parameter sent in the first Security Association frame. If W=Witness_A in step 112, then the process continues. Otherwise, the process ends if this check fails.

In steps 113 and 114, Initiator 101 and Responder 102 each compute their own value D as follows:

$$D = CMAC(Nonce\_A \| Nonce\_B, Nonce\_B \| Nonce\_A \| Temp\_1, 16) \quad (11)$$

Initiator 101 and Responder 102 further calculate respective display values (Display_A, Display_B) as follows:

$$Display = BS2DI(D) \quad (12)$$

where the function BS2DI(BS) converts a bit string (BS) to a positive decimal integer for display by treating the left-most bit of the string as the most-significant bit of the equivalent binary integer. The BS2DI function may be based on IEEE Std P1363-2000 in one embodiment.

Both Initiator 101 and Responder 102 then display their respective display values (Display_A, Display_B). A user then compares the displayed values to confirm that Display_A=Display_B. The user may view the display on both devices. Alternatively, if the user does not have access to both devices, such as if they are in different locations, the user may view the display on one device and compare it to the display on the second device, where the second device display is relayed by a trusted source through a trusted channel. Upon successfully confirming that the displays match, the user indicates this match to each device by pressing a button or providing some other user input to the devices.

After receiving confirmation that Display_A=Display_B, both devices treat the identity of the other device authenticated and consider the association procedure completed. In step 115, both devices then compute a shared master key (MK) from the shared secret (DHKey) using the following formula:

$$MK = CMAC(Temp\_2, Nonce\_A \| Nonce\_B, 128) \quad (13)$$

where $$Temp\_2 = LMB\_128(DHKey) \quad (14)$$

In one embodiment of the process illustrated in FIG. 1, the cipher-based message authentication code (CMAC) algorithm as specified in NIST Special Publication 800-38B, with the AES forward cipher function under a 128-bit key as specified in FIPS Pub 197, is used to compute key message authentication codes (KMAC) and to derive the shared master key (MK). Specifically, the functional notation CMAC(K, M) represents the 128-bit output of the CMAC applied under key K to message M based on the AES forward cipher function.

It will be understood that the present invention is not limited to creating the shared master key using a cipher-based message authentication code (CMAC) algorithm. Other methods of creating a message authentication code may also be used. For example, a message authentication code based on a hash function may also be used. In an alternative embodiment, a keyed-hash message authentication code (HMAC) developed by NIST and described in FIPS publication 198 may be used with a secure hash algorithm (SHA), such as SHA-256 specified in FIPS publication 180-2, to calculate the key message authentication codes (KMAC) and shared master key (MK).

It will be understood that the steps and messages illustrated in FIG. 1 may be performed in the order illustrated or in any other order. Moreover, in other embodiments, one or more of the steps and messages may occur at the same time or at different times. Additionally, in other embodiments, the display authenticated security association may be performed with all or less than all of the steps and messages illustrated in FIG. 1 or with additional steps or methods not shown in FIG. 1.

FIG. 2 illustrates data in an example of a Security Association frame 200 that can be exchanged between an Initiator and a Responder (such as a node and a hub) to execute the display authenticated security association procedure. In one embodiment, Security Association frame 200 represents the payload of a message that includes additional medium access control and/or network routing information. It will also be understood that a security association procedure may be accomplished using a Security Association frame having fields organized in a different manner and/or having different data. A series of messages, each comprising an embodiment of Security Association frame 200, may be used for a display authenticated security association procedure between two devices to activate a pre-shared MK or generate a new shared MK.

Thus, an exemplary embodiment defines the following fields comprising Security Association frame 200. Recipient Address field 201 is set to the medium access control (MAC) address of the recipient of the current frame or may be set to zero if the MAC address is not known. Sender Address field 202 is set to the MAC address of the sender of the current frame. Security Suite Selector field 203 may be formatted as shown in FIG. 3. Association Control field 204 may be formatted as shown in FIG. 4. Security Association Data field 205 may be formatted as shown in FIG. 5.

FIG. 3 illustrates the parameters of Security Suite Selector field 203 according to one embodiment. Security Association Protocol field 301 may be set according to Table 1 to select a desired security association protocol.

TABLE 1

| FIELD VALUE IN DECIMAL | SECURITY ASSOCIATION PROTOCOL |
| --- | --- |
| 0 | Master key pre-shared association |
| 1 | Unauthenticated association |

TABLE 1-continued

| FIELD VALUE IN DECIMAL | SECURITY ASSOCIATION PROTOCOL |
| --- | --- |
| 2 | Public key hidden association |
| 3 | Password authenticated association |
| 4 | Display authenticated association |
| 5-7 | Reserved |

Security Level field 302 may be set to the security level required by the sender according to Table 2.

TABLE 2

| FIELD VALUE IN DECIMAL | SECURITY LEVEL REQUIRED |
| --- | --- |
| 0 | Level 0 - unsecured communication |
| 1 | Level 1 - authentication but not encryption |
| 2 | Level 2 - authentication and encryption |
| 3 | Reserved |

Control Frame Authentication field 303 may be set to one (1) if control type frames sent from or to the sender need to be authenticated but not encrypted when they are required to have security level 1 or 2. Control Frame Authentication field 303 may be set to zero (0) if control type frames sent from or to this sender needs to be neither authenticated nor encrypted even when they are otherwise required to have security level 1 or 2.

Cipher Function field 304 may be set according to Table 3 to indicate the underlying cipher function selected by this sender for performing security services.

TABLE 3

| FIELD VALUE IN DECIMAL | CIPHER FUNCTION |
| --- | --- |
| 0 | AES-128 forward cipher function |
| 1 | Camellia-128 forward cipher function |
| 2-15 | Reserved |

Field 305 of Security Suite Selector 203 may be reserved to carry other data in other embodiments.

FIG. 4 illustrates the format of Association Control field 204. Association Sequence Number field 401 may be set to a number or position of the current Security Association frame in the execution of the selected security association protocol. For example, Association Sequence Number field 401 is set to one (1) in a first Security Association frame of the protocol, two (2) in a second Security Association frame, etc. The first Security Association frame is the Security Association frame transmitted or retransmitted by the node to initialize the security association. The second Security Association frame is the next Security Association frame transmitted or retransmitted by the responding hub, and so forth.

Association Status field 402 may be set according to Table 4 to indicate a status of the current security association procedure. In one embodiment, Association Status field 402 is used in the in the second Security Association frame of a security association procedure, but is reserved or unused in other Security Association frames.

TABLE 4

| FIELD VALUE IN DECIMAL | ASSOCIATION STATUS |
| --- | --- |
| 0 | Joining the security association procedure |
| 1 | Aborting the security association procedure with a different security suite selector |
| 2 | Aborting the security association procedure due to lack of needed security credential (no master key preshared with the initiator of the security association procedure for master key preshared association; no public key of the initiator of the security association procedure for public key hidden association; no password shared with the initiator of the security association procedure for password authenticated association) |
| 3 | Aborting the security association procedure due to temporary lack of resources |
| 4 | Aborting the security association procedure due to security policy restrictions as imposed by the administrator/owner of this hub on the communications in its body area network (BAN) |
| 5-15 | Reserved |

Field 403 of Association Control field 204 may be reserved to carry other data in other embodiments.

The Security Association Data field 205 may be specific to a selected security association protocol. For master key pre-shared association, the Security Association Data field may not be present. For unauthenticated association, public key hidden association, password authenticated association, and display authenticated association, the Security Association Data field is formatted as illustrated in FIG. 5.

Sender Nonce field 501 may be set to a statistically unique number per sender and per security association procedure. The nonce value is an integer randomly drawn from $\{1, 2, \ldots, 2^{128}-1\}$ and independent of the nonces of other senders. In the first Security Association frame of the security association procedure, the field may be set to the Initiator's nonce or a witness of the Initiator's nonce value. The witness of the Initiator's nonce value may be compute as defined in equation (3) above. In the second and third Security Association frames of the procedure, the field is set to the Responder's nonce value. In the fourth Security Association frame, the field is set to the Initiator's nonce value instead of the witness value.

Sender $PK_X$ field 502 may be set to the x-coordinate of the sender's elliptic curve public key, and Sender $PK_Y$ field 503 may be set to the y-coordinate of the sender's elliptic curve public key.

MK_KMAC field 504 may be set to a key message authentication code for certain fields of the frame payloads of the Security Association frames of the current security association procedure, such as defined in equations (7) and (8) above.

FIG. 6 is a block diagram illustrating a network topology employing embodiments of the invention. Nodes 601, 602 and hubs 603, 604 are organized into logical sets, referred to as networks. In the illustrated embodiment, there is only one hub in a network, but the number of nodes in a network may vary. For example, network 1 605 comprises hub 603 and plurality of nodes 601, and network 2 606 comprises hub 604 and plurality of nodes 602. In one embodiment, data is exchanged directly between the nodes and their respective hub—i.e. within the same network only. In another embodiment of the invention, data may be exchanged between nodes of the same network. The hub and nodes may communicate using a wireless or wireline connection. An individual node and its corresponding hub may create a master key using a display authenticated security association such as the process illustrated in FIG. 1. The master key may then be used to generate a session key for use in secure communications between the node and the hub.

FIG. 7 is a block diagram of an exemplary embodiment of a device 700 implementing embodiments of the invention. Device 700 may be used as a node 601, 602 and/or a hub 603, 604 in FIG. 6. In one embodiment, device 700 is a hub, gateway, or controller controlling and communicating with one or more nodes. In another embodiment, device 700 is a low-power wireless node operating on, in, or around a human or non-human body and communicating with a hub or another node to service one or more applications, such as medical connections, consumer electronics, and personal entertainment.

Processor 701 processes data exchanged with other nodes via transceiver 702 and antenna 703 and/or via wired interface 704 coupled to Internet or another network 705. Processor 701 may be a software, firmware, or hardware based device or a combination thereof. Processor 701 may choose a private key (a, b) and compute a public key ($PK_A$, $PK_B$) from the private key. Processor 701 may compute a shared secret (SS) from a local private key (a, b) and a received or recovered public key ($PK_B$, $PK_A$). Processor 701 may also generate and process messages sent to, and received from, another device for a display authenticated security association procedure. Processor 701 may further hash the shared secret (SS) to create a master key (MK). Processor 701 may further use the master key to create a session key for securing a communication session between this device and the other device.

Memory 706 may be used to store cryptographic data, such as public keys, private keys, shared secret data, master keys, session keys, nonces, witness values, and the like. For such storage, memory 706 is secured from unauthorized access. Memory 706 may also be used to store computer program instructions, software and firmware used by processor 701. It will be understood that memory 706 may be any applicable storage device, such as a fixed or removable RAM, ROM, flash memory, or disc drive that is separate from or integral to processor 701.

Device 700 may be coupled to other devices, such as user interface 707, sensors 708, or other devices or equipment 709. User interface 707 may include, for example, an output display that is adapted to display characters, such as a group of alphanumeric, punctuation, symbols, mathematical operators or other characters in any language or alphabet. The displayed characters may be used in the display authenticated security association procedure described above. User interface 707 may further comprise an input device, such as a button, switch, keyboard, touchpad, or other device capable of receiving an input from a user. The input may be used to indicate whether the displayed value on two devices match or do not match as part of a display authenticated security association procedure.

Device 700 may be adapted to operate in a body area network either as a node or as a hub controlling a plurality of nodes. Sensors 708 may be used, for example, to monitor vital patient data, such as body temperature, heart rate, and respiration. Equipment 709 may be, for example, a monitor or other device that receives and analyzes signals, such as a patient's temperature, heart rate, and respiration, from another node. Alternatively, equipment 709 may be a device for providing a service to a patient, such as controlling an intravenous drip, respirator, or pacemaker.

When used as a node or hub in a body area network, the information transmitted or received by device 700 is likely to include sensitive and/or confidential medical information. Accordingly, it is important to secure any session established by device 700 to protect the data from unauthorized parties, such as an imposter or eavesdropper. The data transmitted or received by device 700 may also include control signals, such as signals to control distribution of medicine or operation of a respirator or pacemaker. It is important that only authorized signals be used to control equipment 709 and that other signals be rejected or ignored to prevent, for example, unauthorized adjustments to drug distribution or respirator operation. Secure communications based upon a display authenticated key exchange as described earlier provide the necessary level of control for such a device.

It will be understood that the networks 605, 606 in FIG. 6 and the device 700 in FIG. 7 are presented for illustrative purposes only and are not intended to limit the scope of the systems or devices that are capable of employing the display authenticated security association procedure described herein. Any two devices in wireless or wireline communication with each other and each having its own set of private and public keys would be capable of using the display authenticated security association procedure for a shared master key creation.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method of establishing a display authenticated secret key between a first device and a second device, comprising at the first device:
   selecting a first nonce;
   computing a witness from the first nonce and a public key of the first device;
   receiving, from the second device, a public key of the second device, and a second nonce;
   computing a shared secret key using a private key of the first device and the public key of the second device;
   computing a first key message authentication code using a truncated version of the shared secret key, the witness, and the second nonce;
   receiving a second key message authentication code from the second device;
   determining if the first key message authentication code and second key message authentication code match;
   if the first and second key message authentication codes match, computing a first display value from the first nonce and the second nonce; and
   displaying the first display value on the first device; and
   receiving an indication that the first display value matches a second display value on the second device, wherein if the first display value matches the second display value, calculating a shared master key using a second truncated version of the shared secret key, the first nonce, and the second nonce.

2. The method of claim 1, wherein computing a witness is performed with a cipher based message authentication code (CMAC) algorithm or a keyed-hash message authentication code (HMAC) algorithm.

3. The method of claim 1, wherein computing a first display value is performed with a cipher based message authentication code (CMAC) algorithm or a keyed-hash message authentication code (HMAC) algorithm.

4. The method of claim 1, further comprising:
   transmitting, to the second device, the first nonce and a public key of the first device.

5. The method of claim 1, wherein computing the first display value also uses the truncated version of the shared secret key.

6. The method of claim 1, further comprising:
   computing a third key message authentication code at the first device using the truncated version of the shared secret key, the witness, and the second nonce in a different order than used in the first key message authentication code; and
   if the first and second key message authentication codes match, transmitting the third key message authentication code from the first device to the second device.

7. A method of establishing a display authenticated secret key between a first device and a second device, comprising at the first device:
   selecting a nonce;
   receiving a public key of the second device and a first witness;
   computing a shared secret key using a private key of the first device and the public key of the second device;
   computing a first key message authentication code using a truncated version of the shared secret key, the witness, and the second nonce;
   receiving a second key message authentication code from the second device;
   determining if the first key message authentication code and second key message authentication code match;
   if the first and second key message authentication codes match, computing a first display value from the first nonce and the second nonce; and
   displaying the first display value on the first device; and
   receiving an indication that the first display value matches a second display value on the second device, wherein if the first display value matches the second display value, the method further comprising:
   calculating a shared master key using a second truncated version of the shared secret key, the first nonce, and the second nonce.

8. The method of claim 7, wherein computing a second witness is performed with a cipher based message authentication code (CMAC) algorithm or a keyed-hash message authentication code (HMAC) algorithm.

9. The method of claim 7, wherein computing a first display value is performed with a cipher based message authentication code (CMAC) algorithm or a keyed-hash message authentication code (HMAC) algorithm.

10. The method of claim 7, further comprising:
    transmitting, to the second device, the first nonce and a public key of the first device.

11. The method of claim 7, further comprising:
    computing a third key message authentication code at the first device using the truncated version of the shared secret key, the witness, and the second nonce in a different order than used in the first key message authentication code; and sending the third key message authentication code to the second device.

12. A method, comprising:
sending a first public key and a first witness from a first device to a second device, the first witness computed from a first nonce;
sending a second public key and a second nonce from the second device to the first device;
computing a first shared secret key at the first device using a private key of the first device and the public key of the second device;
computing a first key message authentication code at the first device using a truncated version of the first shared secret key, the witness, and the second nonce;
receiving a second key message authentication code from the second device;
determining if the first key message authentication code and second key message authentication code match;
if the first and second key message authentication codes match, computing a first display value at the first device from the first nonce and the second nonce;
computing a second display value at the second device from the first nonce, and the second nonce; and
receiving confirmation verifying that the first and second display values match
displaying the first display value on the first device; and
calculating a shared master key using a second truncated version of the first shared secret key, the first nonce, and the second nonce.

13. The method of claim 12, further comprising:
computing a second secret key at the second device using a private key of the second device and the public key of the first device.

14. The method of claim 12, further comprising:
computing a third key message authentication code at the first device using the truncated version of the shared secret key, the witness, and the second nonce in a different order than used in the first key message authentication code;
computing a fourth key message authentication code at the second device using the truncated version of the shared secret key, the witness, and the second nonce in a different order than used in the first key message authentication code;
if the first and second key message authentication codes match, sending the third key message authentication code from the first device to the second device; and
determining at the second device if the third and fourth key message authentication codes match.

15. The method of claim 12, wherein the method is based on discrete logarithm.

16. The method of claim 12, wherein the method is based on elliptic curve discrete logarithm.

17. A device, comprising:
a circuit for sending signals to and receiving signals from another device;
a memory for storing a private key and a public key of the device, and one or more other parameters; and
a processor adapted to perform operations on the signals sent to or received from the other device, the processor operating to:
select a first nonce;
compute a witness from the first nonce, and a public key of the first device;
receive, from the other device, a public key of the second device and a second nonce;
compute a shared secret key using a private key of the device and the public key of the other device;
compute a first key message authentication code using a truncated version of the shared secret key, the witness, and the second nonce;
receive a second key message authentication code from the other device;
determine if the first key message authentication code and second key message authentication code match;
if the first and second key message authentication codes match, compute a first display value from the first nonce, and the second nonce; and
displaying the first display value on the device; and
receiving an indication that the first display value matches a second display value on the second device, wherein if the first display value matches the second display value,
calculating a shared master key using a second truncated version of the shared secret key, the first nonce, and the second nonce.

18. The device of claim 17, further comprising:
a transceiver coupled to the circuit for sending signals to and receiving signals from the other device; and
an antenna coupled to the transceiver for transmitting wireless signals to and receiving wireless signals from the other device.

19. The device of claim 17, further comprising:
a wired interface coupled to the circuit for sending signals to and receiving signals from the other device, the wired interface adapted for transmitting signals to; and
receiving signals from the other device over a wired connection.

20. A device, comprising:
a circuit for sending signals to and receiving signals from another device;
a memory for storing a private key and a public key of the device, and one or more other parameters; and
a processor adapted to perform operations on the signals sent to or received from the other device, the processor operating to:
select a first nonce;
receive a public key of the other device, and a first witness, and zero or more other parameters from the other device;
receive a second nonce and zero or more other parameters from the other device;
compute a second witness from the second nonce, the public key of the other device, and zero or more other parameters;
compute a shared secret key using a private key of the device and the public key of the other device;
compute a first key message authentication code using a truncated version of the shared secret key, the witness, and the second nonce;
receive a second key message authentication code from the other device;
determine if the first key message authentication code and second key message authentication code match;
if the first and second key message authentication codes match, compute a first display value from the first nonce and the second nonce; and
display the first display value on the device;
verify that the first witness and the second witness match;
if the first witness and the second witness match, compute a first display value from the first nonce, the second nonce, and one or more other parameters; and display the first display value on the device;
receiving an indication that the first display value matches a second display value on the second device, wherein if the first display value matches the second display value; and
calculating a shared master key using a second truncated version of the shared secret key, the first nonce, and the second nonce.

21. The device of claim 20, further comprising:
a transceiver coupled to the circuit for sending signals to and receiving signals from the other device; and
an antenna coupled to the transceiver for transmitting wireless signals to and receiving wireless signals from the other device.

22. The device of claim 20, further comprising:
a wired interface coupled to the circuit for sending signals to and receiving signals from the other device, the wired interface adapted for transmitting signals to; and
receiving signals from the other device over a wired connection.

* * * * *